United States Patent [19]

Huber et al.

[11] 4,052,551
[45] Oct. 4, 1977

[54] FLAMEPROOFED MODACRYL COPOLYMERS, FIBERS AND FILAMENTS CONTAINING CARBOXY PHOSPHINIC ACID DERIVATIVES HAVING IMPROVED THERMOSTABILITY

[75] Inventors: Bernd Huber, Hofheim, Taunus; Hans-Jerg Kleiner, Kronberg, Taunus; Hubert Neumaier, Knapsack, all of Germany

[73] Assignee: Hoechst Aktiengesellschaft, Frankfurt am Main, Germany

[21] Appl. No.: 623,336

[22] Filed: Oct. 17, 1975

[30] Foreign Application Priority Data

Oct. 19, 1974  Germany ............................ 2449468
Oct. 19, 1974  Germany ............................ 2449467

[51] Int. Cl.² ............... C08F 30/03; C08F 230/02; C08F 26/06; C08F 4/30
[52] U.S. Cl. .................. 526/278; 260/32.4; 260/79.3 M; 260/956; 526/225; 526/229; 526/258
[58] Field of Search .................. 526/258, 278, 229

[56] References Cited

U.S. PATENT DOCUMENTS

| | | | |
|---|---|---|---|
| 3,243,417 | 3/1966 | Kirby | 526/278 |
| 3,766,252 | 10/1973 | Schmidt et al. | 526/278 |
| 3,824,222 | 7/1974 | Shichijo et al | 526/278 |
| 3,865,796 | 2/1975 | Schmidt et al. | 526/278 |

FOREIGN PATENT DOCUMENTS 168,438   7/1962   U.S.S.R.

*Primary Examiner*—Herbert J. Lilling
*Attorney, Agent, or Firm*—Curtis, Morris & Safford

[57] ABSTRACT

The invention relates to filaments and fibers the filament-forming substance of which is a copolymer of from 35 to 85 weight % of acrylonitrile, from 5 to 45 weight % of vinyl chloride, vinyl bromide and/or vinylidene chloride, from 5 to 30 weight % of carboxyphosphinic acid derivatives of the formula

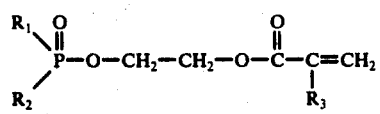

where $R_1$ is lower alkyl having up to 8 carbon atoms, or $CH_2Cl-$, $R_2$ is lower alkyl having up to 8 carbon atoms in which a hydrogen atom may be substituted by a halogen atom in case of $R_1$ being $CH_2Cl-$, and $R_3$ is hydrogen or methyl, and from 0 to 15 weight % of other unsaturated compounds having an activated double bond; the weight percentages being relative to the total amount of monomers, and a process for their manufacture. The filaments obtained are self-extinguishing and excel furthermore by their thermostability and their high degree of whiteness.

3 Claims, No Drawings

FLAMEPROOFED MODACRYL COPOLYMERS, FIBERS AND FILAMENTS CONTAINING CARBOXY PHOSPHINIC ACID DERIVATIVES HAVING IMPROVED THERMOSTABILITY

The present invention relates to flameproofed filaments and fibers made from copolymers of acrylonitrile and vinyl chloride, vinyl bromide and/or vinylidene chloride modified by carboxyphosphinic acid derivatives of the formula

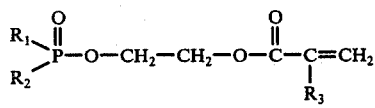
(I)

where $R_1$ is lower alkyl having up to 8 carbon atoms, or $CH_2Cl-$, $R_2$ is lower alkyl having up to 8 carbon atoms in which a hydrogen atom may be substituted by a halogen atom in case of $R_1$ being $CH_2Cl-$, and $R_3$ is hydrogen or methyl.

It is known to flameproof polymers by addition or incorporation of phosphorus containing compounds. Vinyl- or allylphosphonic acid derivatives have been used hitherto as phosphorus containing modification compounds. Carboxylic acid derivatives of phosphine oxide are described in German Offenlegungsschrift No. 2,052,568. The use of carboxyphosphonic acid and carboxyphosphinic acid derivatives for preparing flameproofed polystyrene is indicated in the Soviet Union Pat. No. 168,438.

It has been found that considerably improved flame retarding properties of copolymers made from acrylonitrile and vinyl bromide, vinylidene chloride and/or vinyl chloride are attained by adding compounds of phosphine oxide, while the corresponding phosphonic acid derivatives practically do not result in a flame retarding action improved by synergism. However, a disadvantage of the polymers modified with phosphine oxide compounds according to German Offenlegungsschrift No. 2,052,568 and especially the filaments and fibers manufactured therefrom resides in the poor thermostability of these polymers and the shaped articles manufactured therefrom.

Surprisingly, it has now been found that copolymers of acrylonitrile and vinyl chloride, vinyl bromide and/or vinylidene chloride modified with carboxyphosphinic acid derivatives yield polymers and filaments or fibers made from these polymers which have comparably good flame retarding properties as well as considerably improved thermostability. The filaments and fibers have therefore a substantially reduced tendency to yellowing at elevated tamperatures as compared to the flame-proofed modacryl filaments and fibers hitherto known. Modacryl filaments and fibers having an especially high degree of whiteness and thermostability are obtained when carboxyphosphinic acid derivatives of formula I, where $R_1$ is $CH_2Cl-$, are used as modification agent for the fiber-forming copolymers.

By modacryl fibers, there are to be understood those multipolymer fiber materials containing a minimum of 35 and a maximum of 85 weight % of acrylonitrile units.

The filaments and fibers in accordance with this invention are obtained by spinning products obtained by copolymerization of acrylonitrile and optionally other unsaturated compounds having an activated double bond with vinyl chloride, vinyl bromide and/or vinylidene chloride, and with carboxyphosphinic acid derivatives corresponding to formula I. Preferably, the copolymers used as starting products for the fibers contain from 5 to 45 weight % of vinyl chloride, vinyl bromide and/or vinylidene chloride components and from 5 to 30 weight % of components of formula I compounds. The weight percentges indicated are relative to the total polymer.

Optimum properties are attained in such filaments and fibers the substance of which is obtained by polymerization of acrylonitrile and optionally further unsaturated compounds having an activated double bond with 10 to 30 weight % of vinyl chloride, vinyl bromide and/or vinylidene chloride, and 8 to 20 weight % of carboxyphosphinic acid derivatives of formula I.

The compounds of formula I are advantageously prepared by reacting for example a phosphinic acid chloride of the formula II

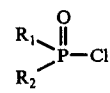
(II), where $R_1$ and $R_2$ are as defined above, with, for example, stoichiometric amounts of a compound of the formula III

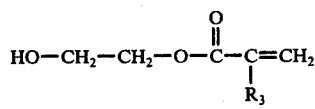
(III), where $R_3$ is as defined above, at a temperature of from 20° to 50° C, in an invert solvent, for example toluene, with addition of equimolar amounts of a base, for example triethylamine, and a polymerization inhibitor. After having filtered off the hydrochloride formed, the solvent is eliminated and the product is distilled in vacuo.

The polymerization of the phosphorus containing carboxylic acid derivatives of formula I with acrylonitrile and other unsaturated compounds having an activated double bond is carried out according to the processes known for the polymerization of acrylonitrile, for example by ionic, free radical-forming or redox catalysis processes, in solution or dispersion, as solution, bead or precipitation polymerization on the one hand, or in bulk on the other hand. Generally, the free radical-forming or the redox polymerization are to be preferred to the ionic polymerization which, especially in the case of acrylic acid esters, results in low polymerization degrees and poor yields.

Suitable catalyst systems are for example hydrogen peroxide, potassium or ammonium peroxodisulfate, dibenzoyl peroxide, tert.-butyl-hydroperoxide, di-tert.-butylperoxide and other organic peroxides, diazomethane, azo-isobutyric acid nitrile and derivatives, diazonium and diazo compounds, inorganic and organic peroxides in combination with iron(II) salts, with sodium bisulfite, sulfinic acids or mercaptans. The reaction may also be stated by free radical-forming irradiation.

As solvents or diluents, there are suitable numerous organic compounds, for example dimethyl formamide, chlorobenzene, methanol, ethanol, i-propanol, acetone. Operation in aqueous systems is preferred above all.

Usual emulsifiers and protecting colloids may be added to the polymerization in heterogeneous phase.

Examples of further comonomers having an activated double bond are the following compounds: acrylamide, acrylic acid and the esters thereof, vinyl esters and vinyl ethers such as vinyl acetate, vinyl stearate, vinyl-butyl ether; halogeno-acetic acid vinyl esters, such as bromoacetic acid vinyl ester, dichloroacetic acid vinyl ester, trichloroacetic acid vinyl ester; styrene, maleimide etc.

Tests have proved that filaments and fibers of polymers obtained by polymerization of carboxylic acid derivatives of formula I and acrylonitrile alone have poor flame retarding properties. Optimum flame protection is attained when besides acrylonitrile also halogen containing comonomers, that is, vinyl chloride, vinyl bromide and/or vinylidene chloride, are incorporated into the polymer. Only on this condition self-extinguishing polymers are obtained. The polymers obtained are soluble in the solvents known for polyacrylonitrile, for example dimethyl formamide, dimethyl acetamide, dimethyl sulfoxide or ethylene carbonate. The solutions prepared with these solvents may be spun according to the processes known for wet spinning of polyacrylonitrile, for example by forcing the polymer solutions through nozzles into a coagulation bath consisting of the solvent and a non-solvent, drawing the filaments so obtained in further baths, liberating them from the solvents used, and subsequently drying the filaments. Because of the good thermostability of the described polymers, however, filaments and fibers may also be manufactured according to known dry spinning processes, the manufacture of staple fibers being carried out by cutting the tows according to known processes.

The following examples illustrate the invention.

EXAMPLE 1

The following amounts of the following substances were introduced into a steel vessel having a capacity of 1 liter: 250 ml/h of a monomer mixture consisting of 72 parts by weight of acrylonitrile, 15 parts by weight of vinylidene chloride and 13 parts by weight of a compound of the formula

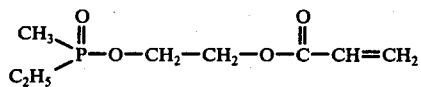

250 ml/h of a solution of 10 g of sodium acetate, 15 g of sodium-methallyl sulfonate and Mohr's salt in 1750 ml of water, which solution was adjusted by means of sulfuric acid to a pH of 2.5, varying amounts of a solution of potassium peroxodisulfate in water and a solution of sodium disulfite in water.

The weight ratio of potassium peroxodisulfate to sodium disulfite was 1 : 4. The amounts required depended on the intended polymerization degree.

The polymerization was carried out at 55° C with pressure. The polymer suspension formed was discharged continuously after a residence time of 1 hour, thus obtaining a conversion rate of about 80%. The polymer was carefully washed and dried.

The relative viscosities were measured at 25° C on a 0.5% solution in dimethyl formamide.

The polymer was introduced into dimethyl formamide at 0° to −20° C and with agitation, and agitation was continued for ½ hour at 60° C. Subsequently, the solution was filtered and degassed. The polymer content of the spinning solutions was 15 to 30 weight %, relative to the total solution. The spinning solution was forced through a nozzle having 100 holes of a diameter of 80 μ, into a coagulation bath consisting of 65% of dimethyl formammide and 35% of water. The temperature of the spinning bath was 30° C. The filaments so obtained were drawn to about 4 times their length in two further hot baths having a lower dimethyl formamide content, washed with water in further baths and dried on hot godets. After drying, a further drawing by 25% of their length was carried out.

The degree of whiteness of these filaments was determined; the quotient of the reflectance at 426 nm ($R_{426}$), divided by the brightness value, serving as measure for the degree of whiteness.

The filaments obtained were steamed at 110° C and processed to a tubular knitted fabric on a circular knitter of Messrs. Velha.

The textile values indicated in Table 2 were determined after steaming. The tubular knitted fabric obtained was washed several times, dried and examined on a semi-circle tester according to German Industrial Standard DIN 54,331.

The thermostability was tested on the polymer powder, and in part on the filaments spun therefrom.

The polymer powder was screened and exposed to thermal strain at 150° C in a drying cabinet. The reflectance was measured by means of the reflectance photometer Elrepho of Messrs. Zeiss. The brightness was determined by means of the colorimetric filter FMY/C adjusted to a calibrated MgO working standard, and the value $R_{426}$ was determined with the aid of the filter R 42 (main wave length 426 nm).

The results are indicated in Tables 1 and 2.

EXAMPLE 2

In accordance with Example 1, a further copolymer was prepared for a comparison and filaments were spun from this material. The different test conditions and the results obtained are indicated in Tables 1 and 2.

EXAMPLE 3

Example 1 was repeated, but 14 parts by weight of a compound of the following formula

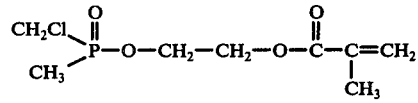

containing 71 parts by weight of acrylonitrile and 15 parts by weight of vinylidene chloride were copolymerized. The different test conditions and the results obtained are indicated in Tables 1 and 2.

The results of these Tables 1 and 2 show that the thermostability of modacryl filaments and fibers and the copolymers used as basic material thereof depends considerably on the kind of the phosphorus derivative employed. At about the same phosphorus content in the copolymer, the flame protection is practically equal when phosphinic acid derivatives and phospine oxide derivatives are used; however, when the copolymer is subjected to thermal strain, the material modified with phosphine oxide derivatives shows heavy discoloration which becomes evident by the indicated brightness values.

Furthermore, the test results indicate that in the case of fibers of copolymers containing compounds of formula I where $R_1$ is $CH_2Cl-$, no discoloration can be measured. Fibers according to Example 3 are completely transparent upon visible examination, while the filaments according to Example 1 are slightly turbid. The filaments of comparative Example 2 are heavily discolored.

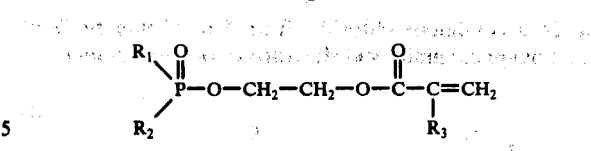

where $R_1$ is lower alkyl having up to 8 carbon atoms, or $CH_2Cl-$, $R_2$ is lower alkyl having up to 8 carbon atoms

TABLE 1

| Example No. | phosphorus derivative | monomer composition in weight % | η rel. | analysis data % P | analysis data % Cl | brightness (%) before heating | brightness (%) after 2h at 150° C |
|---|---|---|---|---|---|---|---|
| 1 | $CH_3\!\!-\!\!\overset{O}{\underset{C_2H_5}{\overset{\|}{P}}}\!\!-\!\!O\!\!-\!\!CH_2\!\!-\!\!CH_2\!\!-\!\!O\!\!-\!\!\overset{O}{\overset{\|}{C}}\!\!-\!\!CH\!=\!CH_2$ | 72 % ACN<br>15 % VCl$_2$<br>13 % PD | 1.8 | 1.5 | 12.7 | 86.2 | 37.6 |
| 2 (comparison) | $CH_3\!\!-\!\!\overset{O}{\underset{CH_3}{\overset{\|}{P}}}\!\!-\!\!CH_2\!\!-\!\!O\!\!-\!\!\overset{O}{\overset{\|}{C}}\!\!-\!\!\underset{CH_3}{C}\!=\!CH_2$ | 75 % ACN<br>15 % VCl$_2$<br>10 % PD | 1.9 | 1.7 | 13.1 | 85.0 | 22.5 |
| 3 | $CH_2Cl\!\!-\!\!\overset{O}{\underset{CH_3}{\overset{\|}{P}}}\!\!-\!\!O\!\!-\!\!CH_2\!\!-\!\!CH_2\!\!-\!\!O\!\!-\!\!\overset{O}{\overset{\|}{C}}\!\!-\!\!\underset{CH_3}{C}\!\!H\!=\!CH_2$ | 71 % ACN<br>15 % VCl$_2$<br>14 % PD | 2.1 | 1.6 | 15.1 | 84.9 | 65.7 |

ACN = acrylonitrile
VCl$_2$ = vinylidene chloride
PD = phosphorus derivative

TABLE 2

| Example | concentration of the spinning solution weight % | filaments titer tex | tensile strength g/tex | elongation at break % | residual DMF content % | brightness in % before heating | brightness in % after 2h at 150° C | degree of whiteness $R_{426}$ brightness | tubular knitted fabric area weight g/m$^2$ | number of stitches per cm$^2$ | combustion test acc. to DIN 54 331 semi-circle tester |
|---|---|---|---|---|---|---|---|---|---|---|---|
| 1 | 26 | 38 | 20 | 25 | 0.10 | 79 | 41 | 0.91 | 370 | 120 | all 7 test specimens extinguished directly after removal of the flame; combustion distance (angle):32° |
| 2 | 24 | 41 | 21 | 31 | 0.20 | 76 | 23 | — | 440 | 120 | all 7 test specimens extinguished directly after removal of the flame; combustion distance (angle):30° |
| 3 | 22 | 39 | 18 | 26 | 0.20 | — | — | 1.03 | 420 | 130 | all 7 test specimens extinguished directly after removal of the flame; combustion distance (angle) 29° |

What is claimed is:

1. A modacrylic copolymer of 35 to 85% by weight of acrylonitrile, 5 to 45% by weight of vinyl chloride, vinyl bromide, vinylidene chloride or a mixture thereof and 5 to 30% by weight of a carboxy phosphinic acid of the formula in which a hydrogen atom may be substituted by a halogen atom in case of $R_1$ being $CH_2Cl-$, and $R_3$ is hydrogen or methyl, and from 0 to 15 weight % of other unsaturated compounds having an activated double bond the weight percentages being relative to the total amount of monomers.

2. Self-extinguishing filaments and fibers of modacryl polymers, wherein the filament-forming substance is a copolymer of from 35 to 85 weight % of acrylonitrile, from 5 to 45 weight % of vinyl chloride, vinyl bromide and/or vinylidene chloride, from 5 to 30 weight % of carboxyphosphinic acid derivatives of the formula

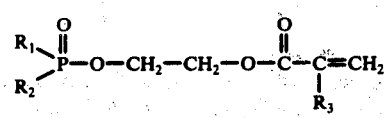 (I)

where $R_1$ is lower alkyl having up to 8 carbon atoms, or $CH_2Cl-$, $R_2$ is lower alkyl having up to 8 carbon atoms in which a hydrogen atom may be substituted by a halogen atom in case of $R_1$ being $CH_2Cl-$, and $R_3$ is hydrogen or methyl, and from 0 to 15 weight % of other unsaturated compounds having an activated double bond; the weight percentages being relative to the total amount of monomers.

3. Filaments and fibers as claimed in claim 2, wherein from 8 to 20 weight % of carboxyphosphinic acid derivative of formula I is contained in the copolymer.

* * * * *